United States Patent
Enderli et al.

(10) Patent No.: US 10,585,172 B2
(45) Date of Patent: Mar. 10, 2020

(54) RADAR DETECTION METHOD DISTINGUISHING RAIN ECHOES AND RADAR IMPLEMENTING SUCH A METHOD

(71) Applicant: THALES, Courbevoie (FR)

(72) Inventors: Cyrille Enderli, Elancourt (FR); Mathias Lombard, Elancourt (FR); Marie-Françoise Schaub, Elancourt (FR)

(73) Assignee: THALES, Courbevoie (FR)

( * ) Notice: Subject to any disclaimer, the term of this patent is extended or adjusted under 35 U.S.C. 154(b) by 174 days.

(21) Appl. No.: 15/527,655

(22) PCT Filed: Sep. 4, 2015

(86) PCT No.: PCT/EP2015/070280
§ 371 (c)(1),
(2) Date: May 17, 2017

(87) PCT Pub. No.: WO2016/091407
PCT Pub. Date: Jun. 16, 2016

(65) Prior Publication Data
US 2017/0328985 A1   Nov. 16, 2017

(30) Foreign Application Priority Data

Dec. 12, 2014 (FR) .................... 14 02838

(51) Int. Cl.
*G01S 7/41* (2006.01)
*G01S 13/24* (2006.01)
*G01S 13/95* (2006.01)

(52) U.S. Cl.
CPC .............. *G01S 7/414* (2013.01); *G01S 13/24* (2013.01); *G01S 13/958* (2013.01); *Y02A 90/18* (2018.01)

(58) Field of Classification Search
CPC ......... G01S 7/414; G01S 13/24; G01S 13/958
See application file for complete search history.

(56) References Cited

U.S. PATENT DOCUMENTS

| | | | | |
|---|---|---|---|---|
| 4,739,327 A | * | 4/1988 | Konig | .................. G01S 7/2921 342/149 |
| 4,881,077 A | * | 11/1989 | Jehle | ...................... G01S 7/026 342/26 B |
| 5,189,426 A | * | 2/1993 | Asbury | .................. G01S 13/24 342/101 |

(Continued)

FOREIGN PATENT DOCUMENTS

| EP | 0 147 305 A2 | 7/1985 |
|---|---|---|
| EP | 2 400 316 A1 | 12/2011 |

OTHER PUBLICATIONS

Y. Li, G. Zhang, R. J. Doviak, L. Lei and Q. Cao, "A New Approach to Detect Ground Clutter Mixed With Weather Signals," in IEEE Transactions on Geoscience and Remote Sensing, vol. 51, No. 4, pp. 2373-2387, Apr. 2013. (Year: 2013).*

(Continued)

*Primary Examiner* — Marcus E Windrich
(74) *Attorney, Agent, or Firm* — Baker & Hostetler LLP (57) ABSTRACT

The distinguishing of rain echoes from ground echoes is performed by an analysis of the attenuation of the radar echoes, a radar echo being classed as a rain echo if its attenuation on a logarithm scale as a function of distance fluctuates around an affine straight line according to a given statistical law.

10 Claims, 7 Drawing Sheets

(56) References Cited

U.S. PATENT DOCUMENTS

| | | | | |
|---|---|---|---|---|
| 6,937,185 | B1* | 8/2005 | Collazo | G01S 13/5244 342/159 |
| 8,749,429 | B2* | 6/2014 | Heilmann | G01S 7/4004 342/26 D |
| 8,836,572 | B2* | 9/2014 | Heilmann | G01S 7/41 342/70 |
| 2008/0164769 | A1* | 7/2008 | Eck | G05B 9/02 307/116 |
| 2008/0191929 | A1* | 8/2008 | Wood | G01S 7/34 342/73 |
| 2012/0169053 | A1* | 7/2012 | Tchoryk, Jr. | G01S 7/497 290/44 |

OTHER PUBLICATIONS

Thomas M. Over et al., "A Space-Time Theory of Mesoscale Rainfall using Random Cascades," Journal of Geophysical Research, vol. 101, No. D21, Nov. 27, 1996, pp. 26319-26331.

B. Haddad et al., "Analyse de la Dimension Fractale des échos radar en Algérie, France et Sénégal," [Analysis of the Fractal Dimension of radar echoes in Algeria, France and Senegal], Télédétection, 2006, vol. 5, No. 4, pp. 299-306.

K. L. S. Gunn et al., "The Microwave Properties of Precipitation Particles," Q.J.R. Meteorol. Soc., vol. 80, pp. 522-545, 1954.

M. Khider et al., "Analyse Multifractale des Echos Radar par la Méthode des Maximums des Modules de la Transformée en Ondelette (MMTO) 2D pour les Sites de Bordeaux (France), Sétif (Algérie): Application à l'Elimination des Echos Parasites," [Multi-fractal Analysis of Radar Echoes by the Method of Maxima of the 2D Wavelet Transform Moduli for the Sites of Bordeaux (France), Sétif (Algeria): Application to the Elimination of the Spurious Echoes], Revue Télédétection, 2008, vol. 8, No. 4, pp. 271-283.

Marzoug et al., "Improved Range Profiling Algorithms of Rainfall Rate from a Spaceborne Radar with Path-integrated Attenuation Constraint," May 20, 1990, pp. 2463-2466, XP010002030.

C. Z. Van de Beek et al., "Performance of high-resolution X-band radar for rainfall measurement in The Netherlands," Hydrology and Earth System Sciences Discussions, vol. 6, No. 5, Sep. 23, 2009, pp. 6035-6085, XP055200375.

Urs Germann et al., "Radar precipitation measurement in a mountainous region," Quarterly Journal of the Royal Meteorological Society, vol. 132, No. 618, Jul. 1, 2006, pp. 1669-1692, XP055200377.

J. C. Nicol et al., "Techniques for improving ground clutter identification," IAHS Publ. 3XX, Apr. 1, 2011, XP055200381.

V. Lakshmanan et al., "An Automated Technique to Quality Control Radar Reflectively Data," Journal of Applied Meteorology and Climatology, vol. 46, No. 3, Mar. 1, 2007, pp. 288-305, XP055038019.

Yinguang Li et al., "A new approach to detect the ground clutter mixed with weather echoes," 2011 IEEE Radar Conference, May 23, 2011, pp. 622-626, XP031902176.

Bart Geerts, "P10.9 Airborne Radar and Passive Microwave-Based Classification and Characterization of Tropical Precipitation Profiles," Jul. 18, 2011, XP055200394.

Alberoni et al., "Use of the vertical reflectively profile for identification of anomalous propagation," Meteorological Applications, vol. 8, No. 3, Sep. 1, 2001, XP055200399.

J. Sugier et al., "Detection and removal of clutter and anaprop in radar data using a statistical scheme based on echo fluctuation," Copernicus GmbH, Jan. 1, 2002, pp. 17-24, XP055200403.

Yinguang Li et al., "Scan-to-Scan Correlation of Weather Radar Signals to Identify Ground Clutter," IEEE Geoscience and Remote Sensing Letters, vol. 10, No. 4, Jul. 1, 2013, pp. 855-859, XP011516187.

O. Raaf et al., "Image-Filtering Techniques for meteorological radar," 2008 IEEE International Symposium on Industrial Electronics, Jun. 1, 2008, pp. 2561-2565, XP055200412.

D. E. Rupp et al., "Multiplicative cascade models for fine spatial downscaling of rainfall: parameterization with rain gauge data," Hydrology and Earth System Sciences, vol. 16, No. 3, Jan. 6, 2012, pp. 671-684, XP055200426.

Raymond Wexler et al., "Radar Reflectivity and Attenuation of Rain," Journal of Applied Meteorology, vol. 2, No. 2, Apr. 1, 1963, pp. 276-280, XP055200435.

Walther Asen et al., "A Comparison of Measured Rain Attenuation, Rain Rates and Drop Sizes Distributions," Jan. 4, 2002, XP055200491.

R. Uijlenhoet et al., "Stochastic simulation experiment to assess radar rainfall retrieval uncertainties associated with attenuation and its correction," Hydrology and Earth System Sciences, vol. 12, Mar. 19, 2008, pp. 587-601, XP055200502.

S.J. Malinga et al., "Computation of Rain Attenuation through Scattering at Microwave and Millimeter Bands in South Africa," Progress in Electromagnetics Research Symposium Proceedings, pp. 959-971, Taipei, Mar. 25-28, 2013.

* cited by examiner

RADAR DETECTION METHOD DISTINGUISHING RAIN ECHOES AND RADAR IMPLEMENTING SUCH A METHOD

CROSS-REFERENCE TO RELATED APPLICATIONS

This application is a National Stage of International patent application PCT/EP2015/070280, filed on Sep. 4, 2015, which claims priority to foreign French patent application No. FR 1402838, filed on Dec. 12, 2014, the disclosures of which are incorporated by reference in their entirety.

FIELD OF THE INVENTION

The present invention relates to a radar detection method for distinguishing rain echoes from ground echoes. It also relates to a radar implementing such a method. It applies for example in the field of airborne radars with short detection distances where a problem to be solved is in particular the distinguishing of rain echoes from ground echoes.

BACKGROUND

These short range gate radars, are moreover non-ambiguous in distance. They may be frequency-agile in the X-band, around 10 GHz.

At the operating frequencies of airborne radars, rainfall generates echoes that are often non-negligible and possibly of comparable power to ground echoes in certain cases where heavy rainfalls are present. The presence of rain echoes may then cause a forced shutdown of the operating modes addressed, or indeed carrier navigation errors.

Discriminating surface echoes from atmospheric echoes, in particular those due to rainfall, is a problem often encountered in meteorological applications where surface radars are employed. Most of them operate in S or C band, where the attenuation of the waves during their propagation in the rainfall is not inconvenient, even though some of them are designed to operate in X-band because, in particular, of the compactness and cost advantages, as described in particular in the document by C. Z. van de Beek et al., "Performance of High-Resolution X-Band Radar for Rainfall Measurement in the Netherlands", *Hydrol. Earth Syst. Sci. Discuss.*, vol. 6, pp. 6035-6085, September 2009. There also exists a Ku-band spatial radar dedicated to measurements of tropical precipitations. In contradistinction to the problem addressed by the invention, it is the ground echoes which are then considered to be an inconvenience whilst the rain echoes are of principal interest—besides, the measurements provided by meteorological radars are provided directly as a specific unit of "reflectivity" (in $mm^6/m^3$, denoted Z) which is relevant for estimating an amount of rainfall in a given zone.

Although Doppler or polarimetry information turns out to be useful, in numerous cases only the measurements of power (or of reflectivity) in the domain instrumented in terms of distances and angles are available for specifying the provenance of the received echoes. The most restricted framework in which the invention lies is that of incoherent and non-polarimetric radar, although it remains more generally valid.

In the cases of surface meteorological radars, the ground echoes conventionally due to the relief and objects encountered can be instrumented beforehand in dry weather, and then used to eliminate ground echoes and/or to correct the measurements of rainfall in accordance with procedures based on interpolation, nearest neighbors, weighting, or elementary tracking of rainfall zones. The choice of the installation site is also definitely significant. This "static" approach is obviously not simply applicable to the case of a mobile radar. A possible alternative is to use information sources external to the radar to locate the rainfall zones, such as digital terrain models, a network of meteorological radars or other information sources but solutions of this type depart from the framework of the invention.

However, the most inconvenient echoes in meteorology are those due to propagation anomalies, themselves due to certain schemes of variations of the refractive index of the medium over the large distances probed (hundreds of kilometers). The most problematic conditions are those of "super-refraction", where a fraction of the radar beam (main or secondary lobe) is deviated toward the ground and may moreover be trapped in a propagation conduit close to the ground as in a waveguide. Under such conditions, it may happen that the radar beam touches the ground several times over hundreds of kilometers of distance, creating numerous and powerful undesirable echoes comparable to echoes of heavy rainfalls. In order to isolate these latter, dynamic approaches are necessary since the propagation conditions are by nature variable in time and space, and therefore difficult to foresee and characterize. Although the context is different from the short-range radar modes forming the subject of the invention, it is instructive to examine the way in which the non-foreseeable ground echoes are handled in publications.

The very great majority of published approaches deal with a radar map comprising the measurements in an angle/distance plane. They define various criteria on the basis of the measurement map, in a more or less ad hoc way, which thereafter feed decision trees (see the document by U. Germann et al., "Radar Precipitation Measurement in a Mountainous Region", *Q.J.R. Meteorol. Soc.*, vol. 132, pp. 1669-1692, 2006), Bayesian classifiers (see the document by J. C. Nicol et al., "Techniques for Improving Ground Clutter Identification", Proc. Weather Radar and Hydrology, Exeter (UK), April 2011), or neural networks (see the document by V. Lakshmanan et al., "An Automated Technique to Quality Control Radar Reflectivity Data", *J. Applied Meteorology*, vol. 46, no. 3, pp. 288-305, March 2007), sometimes with the use of fuzzy logic such as for example in the document by Y. Li et al., "A New Approach to Detect the Ground Clutter Mixed with Weather Echoes", *IEEE Radar Conference*, pp. 622-626, Kansas City (Mo.), USA, May 23-27, 2011. Among the most used criteria may be cited the vertical extent of horizontal or vertical reflectivity gradient (or indeed the 3D structure of the reflectivity field), which has shown itself to be effective for discriminating surface echoes, including sea echoes, under a condition of super-refraction. Reflectivity profiles are moreover also used in the document by B. Geerts, "Airborne Radar and Passive Microwave-Based Classification and Characterization of Tropical Precipitation Profiles", 30$^{th}$ *International Conference on Radar Meteorology*, Munich, Germany, Jul. 18-24, 2001, in an airborne and space context for distinguishing precipitations of convective type from those of stratiform type. The reflectivity gradient is however not transposable to the airborne case since it is a criterion which reflects the physics of propagation with upward sighting from the ground, which is very particular to meteorological radars as shown in particular in the document by P. P. Alberoni et al., "Use of the Vertical Reflectivity Profile for Identification of Anomalous Propagation", *Meteorol. Appl.*, vol. 8, pp. 257-266, 2001.

Other criteria that may possibly be employed with incoherent radars are those related to temporal fluctuations from pulse to pulse as in the document by J. Sugier et al., "Detection and Removal of Clutter and Anaprop in Radar Data Using a Statistical Scheme Based on Echo Fluctuation", *Proc. ERAD '02*, pp. 17-24, 2002, or from pointing to pointing of one and the same zone as in the document by Y. Li et al., "Scan-to-Scan Correlation of Weather Radar Signals to Identify Ground Clutter", *IEEE Geoscience and Remote Sensing Letters*, vol. 10, no. 4, pp. 855-859, July 2013. These approaches are based on the relative stationarity of the power of the surface echoes with respect to the rain echoes. They are flawed in the context of the invention because on the one hand of the fast displacement of the carrier during the emission of the radar pulses, and on the other hand because of the frequency agility from pulse to pulse, which is characteristic of certain modes, and rendering the ground echoes fluctuating.

Finally, more general texture criteria, arising from the field of image processing and based on co-occurrence matrices as in particular in the document by O. Raaf, A. Adane, "Image-Filtering Techniques for Meteorological Radar", *IEEE International Symposium on Industrial Electronics (ISIE)*, pp. 2561-2565, Cambridge, Jun. 30-Jul. 2, 2008—that may be calculated fast—have also been proposed. However, the choice of the "offsets" for the calculation of the co-occurrence matrix has a significant impact on the results and there is no clearly established procedure for selecting them.

In another vein, theoretical and empirical studies have revealed a self-similar character in precipitation fields, making it possible to appraise their very great variability, both temporal and spatial, as for example described in the document by T. M. Over, V. J. Gupta, "A Space-Time Theory of Mesoscale Rainfall using Random Cascades", *J. Geophys. Res.*, vol. 101, pp. 26319-26331, 1996. In the document by B. Haddad et al., "Analyse de la Dimension Fractale des échos radar en Algérie, France et Sénégal" [Analysis of the Fractal Dimension of radar echoes in Algeria, France and Senegal], *Télédétection*, vol. 5, no 4, pp. 299-306, 2006, the fractal dimension of the rain echoes in the radar images does not suffice to properly distinguish them from ground echoes, thereby justifying the switch to a finer multi-fractal analysis. Multi-fractal analysis is exploited with more success in particular in the document by M. Khider et al., "Analyse Multifractale des Echos Radar par la Méthode des Maximums des Modules de la Transformée en Ondelette (MMTO) 2D pour les Sites de Bordeaux (France), Setif (Algérie): Application à l'Elimination des Echos Parasites" [Multi-fractal Analysis of Radar Echoes by the Method of Maxima of the 2D Wavelet Transform Moduli for the Sites of Bordeaux (France), Sétif (Algeria): Application to the Elimination of the Spurious Echoes], *Revue Télédétection*, vol. 8, no. 4, pp. 271-283, 2008, to separate surface echoes from rain echoes, or else in various works for simulating and forecasting precipitation fields as described for example in the document by D. E. Rupp et al., Multiplicative Cascade Models for Fine Spatial Downscaling of Rainfall: Parametrization with Rain Gauge Data, *Hydrol. Earth. Syst. Sci.*, vol. 16, pp. 671-684, 2012. This type of approach seems interesting but requires a relatively high complexity of implementation. Moreover, the choice of the relevant multi-fractal coefficients is not obvious a priori.

Employed jointly, the criteria mentioned are more or less characteristic of ground echoes (in particular those arising from abnormal propagation) but generally implicitly assume that the radar does not move and sights upward, which hypothesis is actually satisfied in the case of surface radars but not in the case of airborne radars possessing a non-zero speed of their own.

Another general defect of the numerous approaches making use of the diverse criteria hereinabove is that they involve in one way or another a phase of learning with suites of calibration data. However, in the context of the invention, such a phase is excluded since the environment is changing rapidly and it is not always possible to have the data required or the time to properly conduct a calibration phase.

SUMMARY OF THE INVENTION

An aim of the invention is in particular to propose a solution for discriminating rain echoes that does not require any learning phase. For this purpose, the subject of the invention is a radar detection method for distinguishing rain echoes from ground echoes, the distinguishing of rain echoes from ground echoes being performed by an analysis of the attenuation of the radar echoes, a radar echo being classed as a rain echo if its attenuation on a logarithm scale as a function of distance fluctuates around an affine straight line according to a given statistical law.

In a particular mode of implementation, said analysis being carried out on a number N of distance gates in at least one given angular pointing, the power in each distance gate being received as echo to a number K of emitted pulses, a model which is log-linear with distance is tested on said powers, an echo being classed as a rain echo if the N powers received and the corresponding distances comply with said model, said powers fluctuating around said affine straight line.

The coefficients of said log-linear model are for example estimated on the basis of the powers received in the N distance gates. For example, the arithmetic mean of the K powers received in each distance gate as echo to said K emitted pulses is used for the estimation of said coefficients.

The powers received are for example summed with weightings originating from an estimation of the parameters of said log-linear model, a radar echo being classed as rain echo if the result of the sum is less than a given threshold.

The coefficients of said log-linear model are for example estimated according to a least squares criterion.

In a particular mode of implementation, the coefficients of said log-linear model are estimated according to the maximum likelihood criterion, said affine straight line being obtained by linear regression, the linear regression residual being calculated for the powers received as echoes to the K pulses emitted, the corresponding radar echo being classed as rain echo when the linear regression residual is less than a given threshold. Said analysis being carried out on a number N of distance gates in given number of pointings, the linear regression residual is for example calculated for each pointing.

The noise of said log-linear model is for example modeled as being distributed according to a probability law from the log-Gamma family.

The noise of said log-linear model is for example regarded as Gaussian noise.

The subject of the invention is also a radar implementing a method such as described above.

BRIEF DESCRIPTION OF THE DRAWINGS

Other characteristics and advantages of the invention will become apparent with the aid of the description which follows, given in relation to appended drawings which represent:

FIGS. 6a and 6b, a representation of the linear regression residuals as a function of the pointings, FIG. 6b presenting a zoom of FIG. 6a;

DETAILED DESCRIPTION

Basing oneself on seminal works in the modeling of the effects of X-band attenuation in rainfall, described in particular in the document by K. L. S. Gunn, T. W. R. East, "The Microwave Properties of Precipitation Particles", *Q.J.R. Meteorol. Soc.*, vol. 80, pp. 522-545, 1954, and in the document by R. Wexler, D. Atlas, "Radar Reflectivity and Attenuation of Rain", *J. Appl. Meteorol.*, vol. 2, pp. 276-280, 1963, it is possible to define the mean power $\overline{P}(r)$ received as echo to rainfall at a distance r by the following relation:

$$\overline{P}(r) = \frac{A}{r^2} Z(r) \exp\left(-0.46 \int_0^r k(s)ds\right) \quad (1)$$

where A is a constant related to the parameters of the radar (transmitted power, pulse durations, antenna surface area in particular) and to the dielectric properties of water, Z is the reflectivity of the rainfall in the solution volume at the distance r, and the function k(.) is the specific attenuation in dB/km assumed negligible outside of the cloud.

The coefficient 0.46 in the exponential corresponds to the switch from a power of 10 to an exponential, and it is noted that the mean power is inversely proportional to the square of the distance since the hydrometeors entirely fill the radar beam—in contradistinction to point targets, for which the mean power received is inversely proportional to the fourth power of the distance.

The study of the reflectivity Z, its relationships with the amount of rainfall (in mm/h) and the specific attenuation k via power laws, forms the subject of numerous studies to characterize the spatial links generally operating beyond the X-band, motivated essentially by the evaluation of the propagation losses between space and the ground in various regions with varied climates (see in particular the document by S. J. Malinga et al., "Computation of Rain Attenuation through Scattering at Microwave and Millimeter Bands in South Africa", *Progress In Electromagnetics Research Symposium Proceedings*, pp. 959-971, Taipei, Mar. 25-28, 2013.

In such applications, the waves pass through the rainclouds in a plane steeply inclined toward the vertical and the variations in the attenuation can be significant, according to the statistical distribution of the size of the drops, as shown in particular by the document by W. Asen et al., "A Comparison of Measured Rain Attenuation, Rain Rates and Drop Size Distributions", *Proc. 27$^{th}$ URSI General Assembly*, Session F1, 2002. Inserting the dependency between k(.), Z and the amount of rainfall into relation (1) leads to a differential equation which can be solved exactly to deduce therefrom the corrections to be made to the reflectivity measurements undertaken by the radar to take account of the attenuation in the rainfall. The corresponding algorithm is known as the Hitschfeld-Bordan algorithm, improved later because of the numerical instabilities found in case of radar calibration errors, in particular by the Marzoug-Amayenc algorithm (see the documents M. Marzoug, P. Amayenc, "Improved Range-Profiling Algorithm of Rainfall Rate from a Spaceborne Radar with Path-Integrated Attenuation Constraint", *IEEE Trans. Geoscience and Remote Sensing*, vol. 29, no. 4, pp. 584-592, July 1991 and by R. Uijlenhoet, A. Berne, "Stochastic Simulation Experiment to Assess Radar Rainfall Retrieval Uncertainties Associated With Attenuation and its Correction", *Hydrol. Earth Syst. Sci.*, vol. 12, pp. 587-601, 2008).

The implementation of these models and algorithms is however complex and expensive in calculation time.

In order to avoid the use, either of a learning procedure or of a model as complex as that of relation (1), the invention characterizes the propagation of the waves in rain by a simplified model. Having thus characterized the rain echoes, the method according to the invention analyses the attenuation of the radar echoes at a given sighting angle to decide whether it complies with the characterization. This characterization is in particular defined by a judiciously chosen physical model of attenuation of the propagation of the echoes of electromagnetic fields in rain, simplified in the context of the airborne radar modes addressed.

In the case of the airborne modes addressed, according to the invention, the situation is modeled more simply. In this context, the scanning of the radar is performed vertically and horizontally with an amplitude of a few tens of degrees with respect to the velocity vector of the carrier, over a few kilometers of radial distance. The invention uses the fact that the portion of cloud illuminated at a given vertical sighting angle is locally homogeneous—at the very least over the distance gates where the rain echoes pass the detection threshold—which is reasonable when the velocity vector is not oriented much toward the vertical, so as to deduce therefrom that the functions Z(.) and k(.) over its support are approximately constant. The values of the associated constants depend on the angles of sighting, but, at a given radar pointing, the integral term in relation (1) then becomes an affine function of the distance and after taking logarithms, relation (1) simplifies to:

$$\ln \overline{P}(r) \approx a + br - 2 \ln r \quad (2)$$

a and b being unknown constants dependent on the vertical and horizontal sighting angles.

The natural fluctuations of the rain echoes and the possible frequency agility cause the power measurements to fluctuate around their expectation in accordance with relation (2), independently with a conventionally normal probability law. Thus for K emitted pulses, the vector X of the K complex measurements in a distance gate is a centered Gaussian vector whose covariance matrix is a multiple of the identity I—the coefficient being $\overline{P}$ given by relation (2) at the distance corresponding to the center of the gate.

The method according to the invention then uses the following model under the hypothesis H of rainfall in the distance gate n:

$$H: X_n \sim \mathcal{N}(0, \overline{P}_n I); \ln \overline{P}_n = a + br_n - 2 \ln r_n \quad (3)$$

where $\mathcal{N}$ refers to the complex vector normal law, n is the index of distance gate centered on the distance $r_n$ (which is known), and the $X_n$ are independent in the distance gate n.

According to the invention, a rain echo is characterized if it conforms to this model within limits (thresholds) to be defined, which are described subsequently. Stated otherwise, according to the invention, a rain echo is characterized by the fact that its power on a logarithmic scale decreases in a substantially affine manner with distance.

To test that echoes conform to this model, a first solution is based on the vectors $X_n$ of the complex measurements to test the hypothesis H at a given angular pointing. It consists more particularly in estimating the coefficients a and b and in substituting them into the likelihood function of the vectors $X_n$. This yields a test of the hypothesis H which compares a weighted sum of the norms $\|X_n\|^2$ with a threshold, thus forming a first variant implementation of the invention.

In a preferred mode of implementation of the invention, use is made of the arithmetic mean of the K powers, received in a distance gate as echo to K emitted pulses. The invention advantageously uses the fact that the arithmetic mean of the received powers is the magnitude used for the detection tests already qualified in operation. By calling $m_n$ the arithmetic mean of the powers at the distance gate n, the following relation is obtained:

$$m_n = \frac{1}{K}\|X_n\|^2 \sim \mathcal{G}_{K,1/K}[\overline{P}_n](m_n) = \left(\frac{K}{\overline{P}_n}\right)^K \frac{m_n^{K-1}}{(K-1)!} \exp\left(-K\frac{m_n}{\overline{P}_n}\right) \quad (4)$$

$\mathcal{G}$ referring to the Gamma law, the expression for which is detailed hereinabove.

Accordingly the variable $$\frac{m_n}{\overline{P}_n}$$

has a reduced Gamma law $\mathcal{G}_{K,1/K}[1]$, and then the variable $$w_n = \ln \frac{m_n}{\overline{P}_n}$$

has a reduced log-Gamma law denoted $\mathcal{LG}_{K,1/K}[1]$, the expression for which is defined by the following relation:

$$\mathcal{LG}_{K,1/K}[1](w_n) = \frac{K^K}{(K-1)!} \exp[K(w_n - e^{w_n})] \quad (5)$$

Figure 1:
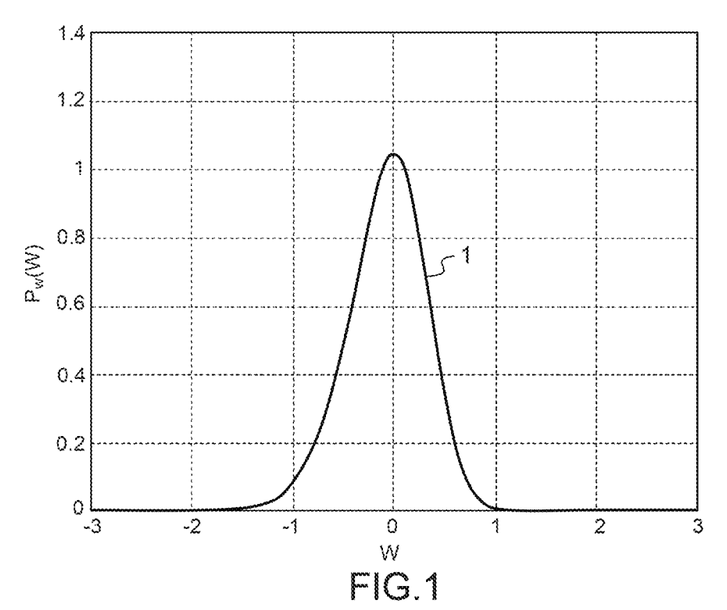
FIG. 1, an exemplary probability law from the log-Gamma family.

FIG. 1 presents the reduced log-Gamma law for a typical value of K. More particularly, FIG. 1 presents by a curve 1 the density of the reduced log-Gamma function as a function of the variable $w_n$.

Although the density is doubly exponential, the representative curve 1 shows that its shape is close to a Gaussian law, this being confirmed by its kurtosis that may be evaluated at 3.305. Its expectation is $\mu = -0.0731$ and its variance is $\sigma^2 = 0.1535$.

By putting $y_n = \ln m_n + 2 \ln r_n$ as the logarithm of the arithmetic mean of the powers received at the distance gate n, corrected for the term which is logarithmic with distance in the model (3), the latter becomes:

$$H': y_n = a + br_n + w_n; w_n \sim \mathcal{LG}_{K,\frac{1}{K}}[1] \quad (6)$$

a and b being unknown and the noise samples $w_n$ being independently and identically distributed according to the log-Gamma law defined by relation (5). The test of the hypothesis H' is ultimately a problem of linear regression in the presence of non-Gaussian noise. If the noise were Gaussian, the well-known optimal solution would consist in comparing the residual of the linear regression in the measurements $y_n$ with a threshold:

$$\frac{1}{\sigma^2}\|QY\|^2 < t \Rightarrow H \quad (7)$$

where t is a threshold and $Y/\sigma$ is the vector of the $(y_n)_{n=1 \ldots N}$ referred to a unit variance (with $\sigma^2 = 0.1535$) at the N distance gates exhibiting a detection (the effect of the expectation $\mu$ of the log-Gamma law is merely to slightly modify the coefficient a in the model), and Q is the following projector:

$$Q = I - H(H^*H)^{-1}H^* \quad (8)$$

H being the matrix with 2 columns hereinbelow:

$$H = \begin{bmatrix} 1 & r_1 \\ \vdots & \vdots \\ 1 & r_N \end{bmatrix} \quad (9)$$

the $n^{th}$ row corresponding to the distance where the $n^{th}$ detection took place.

In relation (7) the threshold t can be fixed simply by noting that the quantity $\|QY\|^2$ has a khi-2 law with (N−2) degrees of freedom. By fixing a confidence rate a, for example $\alpha = 1\%$ (which means that once in a hundred on average the rainfall model is wrongly rejected), the value of the threshold is deduced therefrom via the khi-2 distribution function.

The processing assuming the Gaussian noise hypothesis remains valid on log-Gamma noise.

Figure 2:
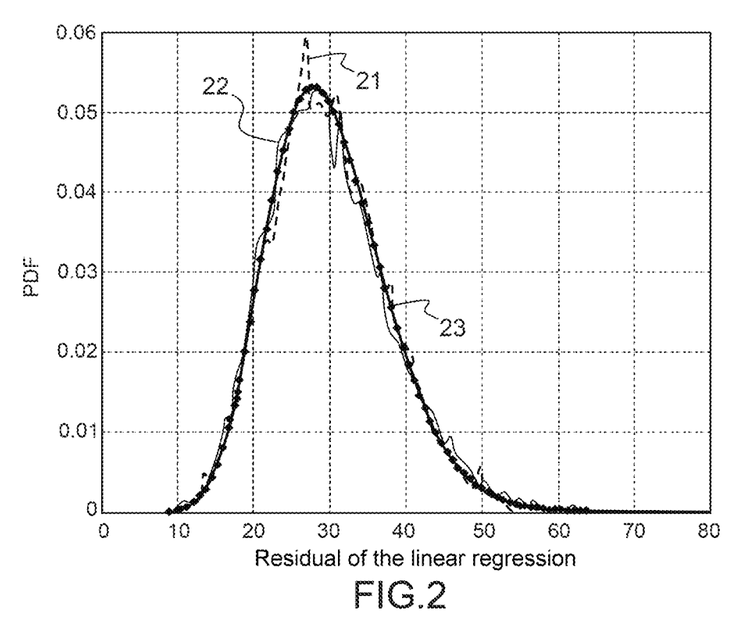
FIG. 2, the probability density of the residual of a linear regression.

For example, FIG. 2 shows the probability density PDF of the residual of the linear regression, estimated over random draws of Gaussian and log-Gamma noise. The khi-2 theoretical density is also plotted dashed. More precisely a first curve 21 represents the Gaussian noise density, a second curve 22 represents the reduced log-Gamma density and a third curve 23 represents the khi-2 theoretical density.

Figure 3:
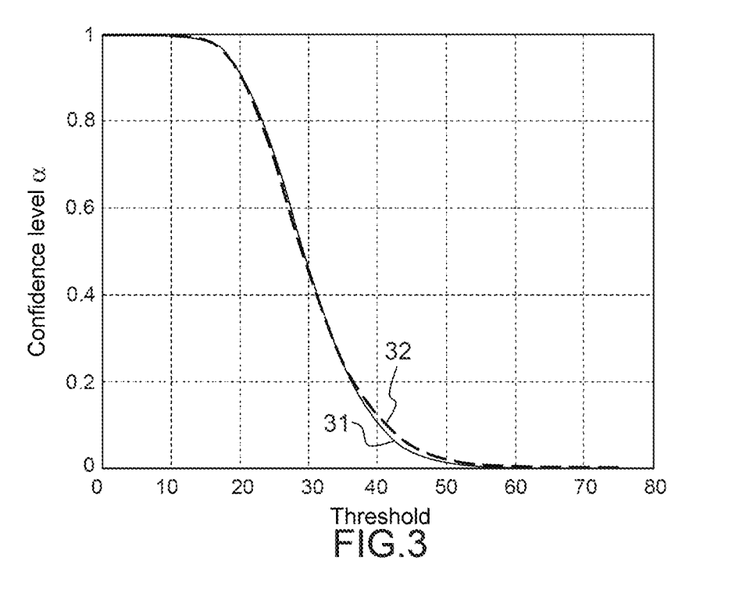
FIG. 3, a representation of confidence levels as a function of values of detection thresholds.

Curves 21, 22, 23 show a very good fit to the three densities. Moreover, if the values of the confidence level a are calculated as a function of the value of the threshold for Gaussian noise and log-Gamma noise, it is found that the normal hypothesis makes it possible to attain the desired confidence level with very little error if the noise has a log-Gamma density as shown by FIG. 3. In this FIG. 3 a first curve 31 and a second curve 32 represent the confidence level a as a function of the detection threshold values, respectively for Gaussian noise and for log-Gamma noise.

In FIGS. 2 and 3, the parameters a and b of the log-linear model have been estimated according to the maximum likelihood criterion in the case of log-Gamma noise. Very similar results can be obtained with an estimation according to a least squares criterion, by validating the Gaussian noise hypothesis of the model to calculate the detection threshold.

FIG. 4 and FIGS. 5a, 5b, 6a, 6b illustrate the application of the invention to a suite of real data arising from an airborne radar, to which synthetic rainfall data are added.

Figure 4:
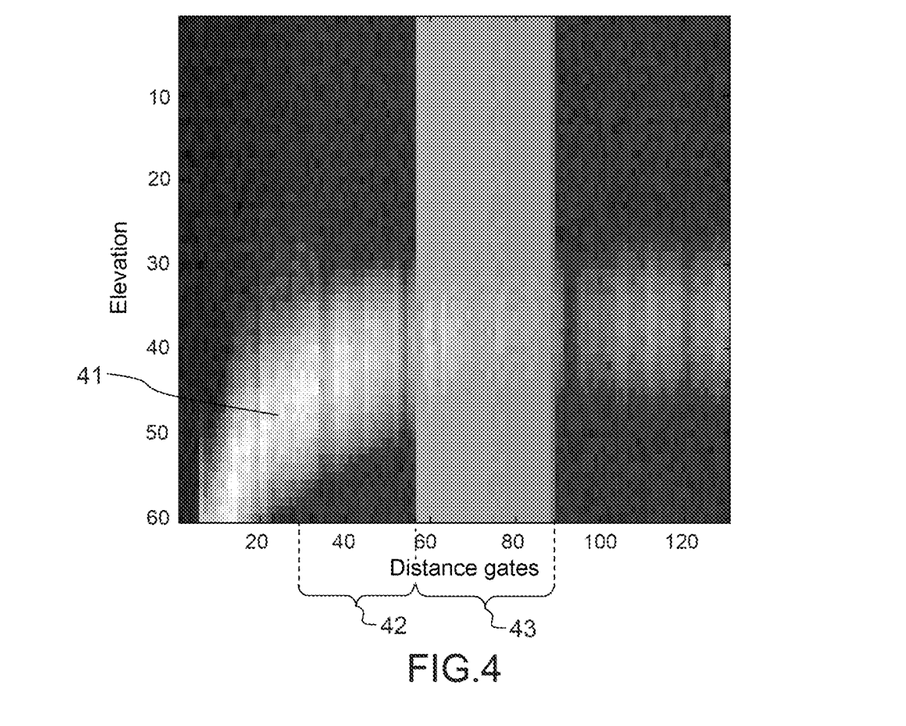
FIG. 4, an example of radar data in a distance/sighting angle plane.

FIG. 4 presents the radar data in the distance/sighting angle plane. More particularly, the data 41 of FIG. 4 represent the arithmetic mean of the power received in the distance gates of the radar as an echo to K emitted pulses, on a logarithmic scale, for an exemplary vertical scan of some sixty or so elevational pointings going from the highest to the lowest. The ground echoes are visible at the lowest pointings 42, with indices greater than 30, and the synthetic rain echoes are visible in all the pointings 43 between the distance gates of index 60 to 90 approximately.

Figure 5A:
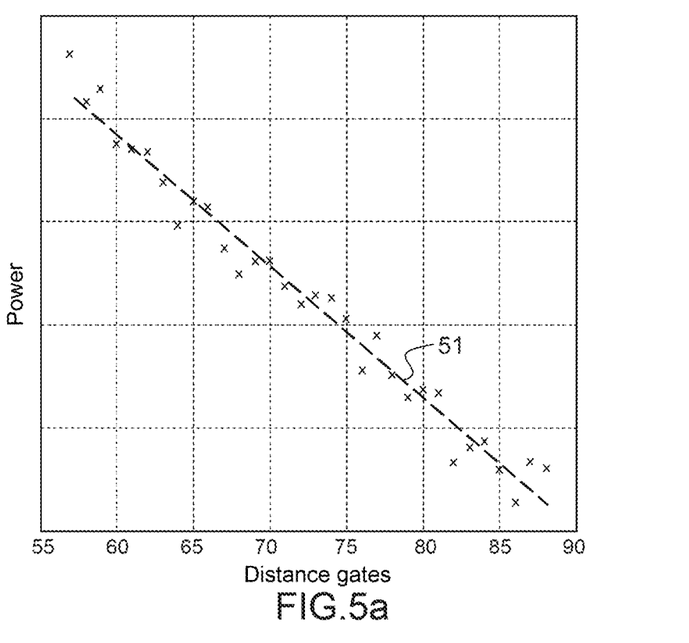
FIGS. 5a and 5b, examples of radar detection as a function of distance in two particular pointings, with the associated regression straight lines.
Figure 5B:
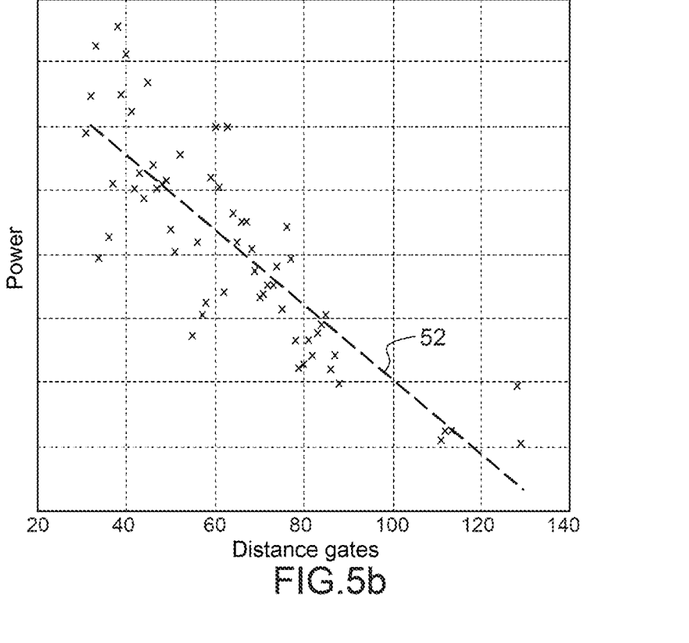

FIGS. 5a and 5b represent the radar detections as a function of distance in two particular pointings of FIG. 4, with the associated regression straight lines 51, 52. By way of example, FIG. 5a represents the powers detected in the distance gates and the associated regression straight line 51, for the highest pointing, for example pointing No. 1. FIG. 5b represents the detected powers and the regression straight line 52 for the lowest pointing, with ground echoes, for example the pointing No. 40.

The detection levels as a function of distance gate indices are represented by crosses.

Other detections and other regression straight lines could be represented in the same manner for other pointings.

The regression straight lines 51, 52 correspond to the log-linear model. They therefore correspond to the affine straight lines characterizing the attenuation of the rain echoes on a logarithmic scale according to distance in the model adopted by the invention. The detection levels as a function of distance gate indices being represented by crosses, FIGS. 5a and 5b show their positioning with respect to the straight lines 51, 52.

In FIG. 5a where only rain echoes are detected, a low linear regression residual is measured, the detection crosses being close and grouped together around the straight line 51. More precisely, the linear regression residual is relatively low with respect to the residual of FIG. 5b which corresponds to a lower pointing comprising ground echoes. In this FIG. 5b, the detection crosses are indeed much more dispersed around the straight line 52, with a large number which are distant.

Figure 6A:
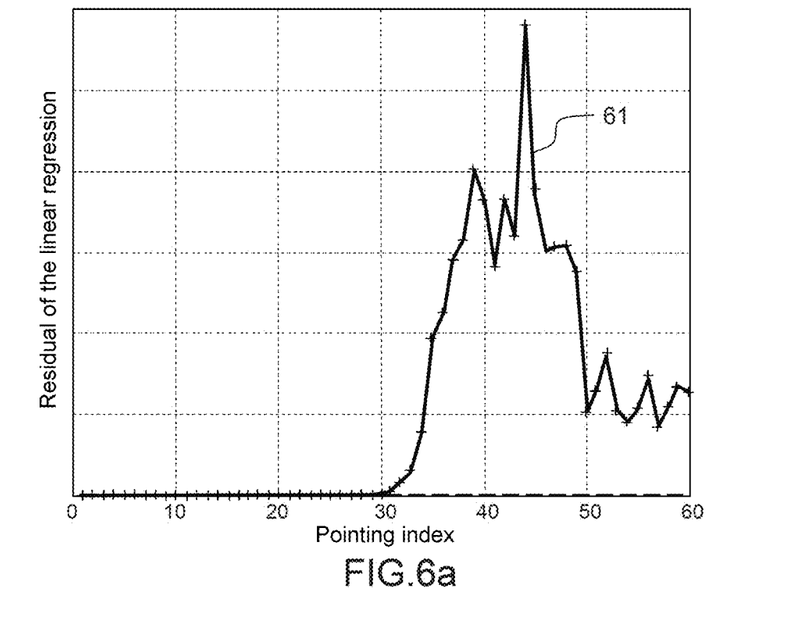
Figure 6B:
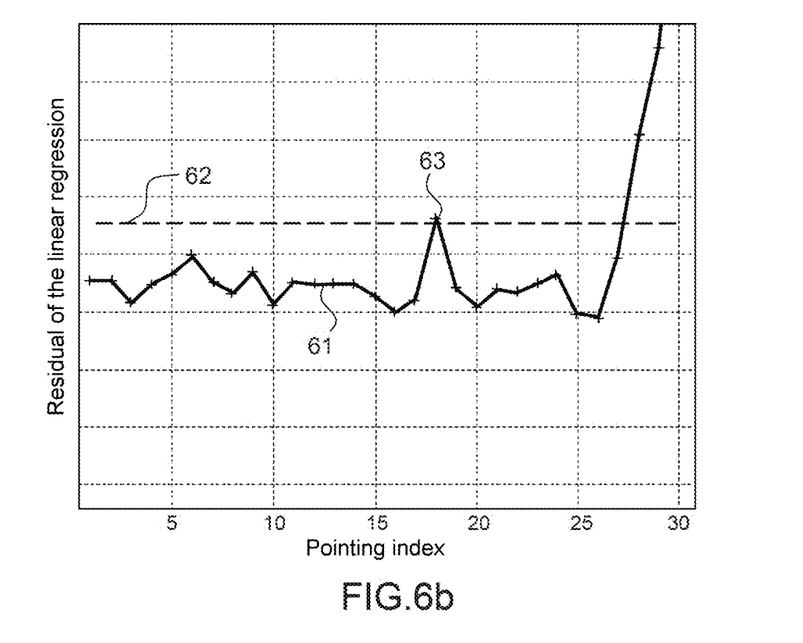

The value of the linear regression residual is plotted in FIGS. 6a and 6b for the sixty or so vertical pointings of FIG. 4, the regression residual characterizing the difference between the regression straight line 51, 52 and the measurement points represented by the crosses.

FIGS. 6a and 6b represent by a curve 61 the linear regression residuals as a function of the pointing indices. FIG. 6b presents a zoom on the highest pointings, with rain only.

Curve 61 shows that the pointing residuals are relatively low until about pointing No. 30. Beyond this pointing they become much more significant. Pointing No. 30 corresponds to that for which ground echoes begin to be detected. FIG. 6b shows a zoom on the rainfall pointings with the value of the threshold dashed 62 for a confidence level $\alpha=5\%$, with a rejection of the rainfall hypothesis at pointing No. 18 corresponding to a confidence level 63 of very slightly less than 5%.

The same preferred implementation of the invention can now be applied to in-flight recordings with rainfall present, the confidence rate a now being set to a stricter value, i.e. $\alpha=1\%$.

FIGS. 7a and 8a, and FIGS. 7b and 8b show real radar data with real rain echoes and the linear regression residuals in the elevational pointings, in similar ways to FIGS. 4 and 6a. FIGS. 7a, 7b and FIGS. 8a, 8b correspond to two different horizontal sightings in the course of one and the same flight.

Figure 7A:
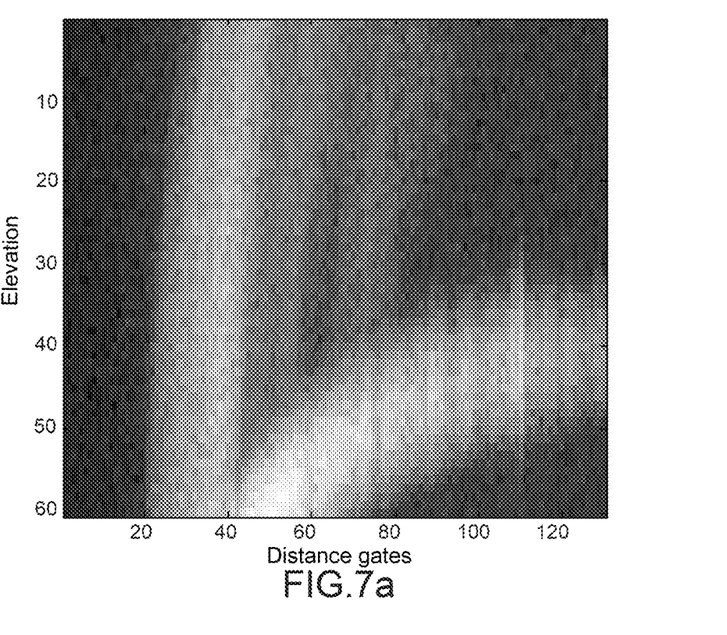
FIGS. 7a and 7b, recordings of radar echoes in the presence of rainfall and the linear regression residuals in the elevational pointings.

FIG. 7a shows the recordings in the presence of rainfall for a first horizontal sighting.

Figure 7B:
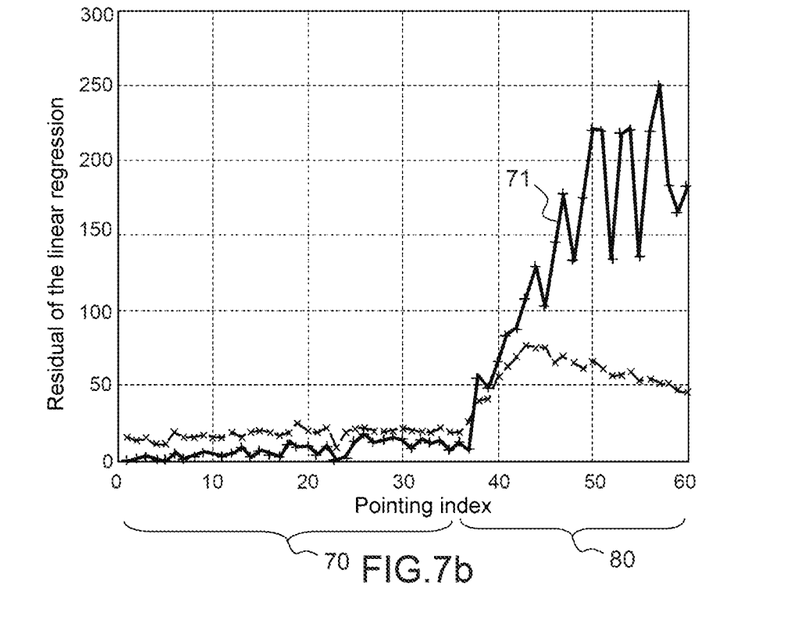

FIG. 7b shows by a first curve 71 the regression residual values and shows by a second curve 72 the values of the thresholds corresponding, as a function of the indices of pointings corresponding to the first horizontal sighting.

Figure 8A:
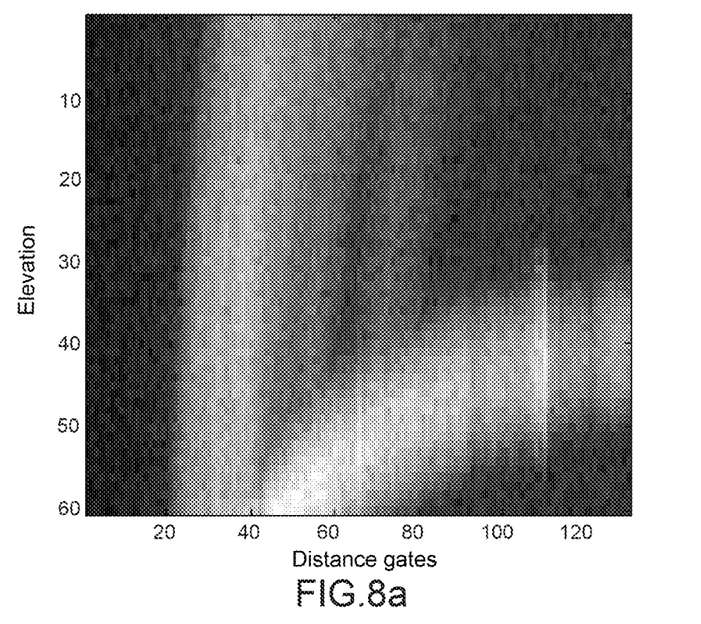
FIGS. 8a and 8b, recordings of radar echoes in the presence of rainfall and the linear regression residuals in the elevational pointings, in another horizontal sighting direction.

FIG. 8a shows the recordings in the presence of rainfall for a second horizontal sighting.

Figure 8B:
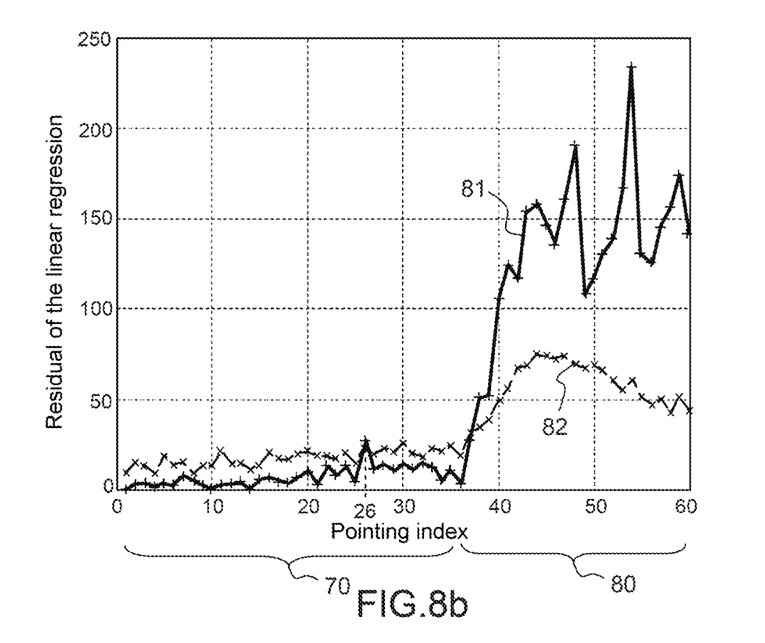

FIG. 8b shows by a first curve 81 the regression residual values and shows by a second curve 82 the values of the thresholds corresponding, as a function of the indices of pointings corresponding to the second horizontal sighting.

In both these cases, the values of regression residuals remain under the threshold in the top pointings 70 containing only rain echoes and become appreciably larger and greater than the threshold in the pointings 80 where ground echoes are present. The rainfall model is wrongly rejected in pointing No. 26 of FIG. 8b. Over about 60 analyzed pointings containing rainfall only, this gives an acceptable rejection rate, compatible with a rejection rate fixed elsewhere.

Figure 9A:
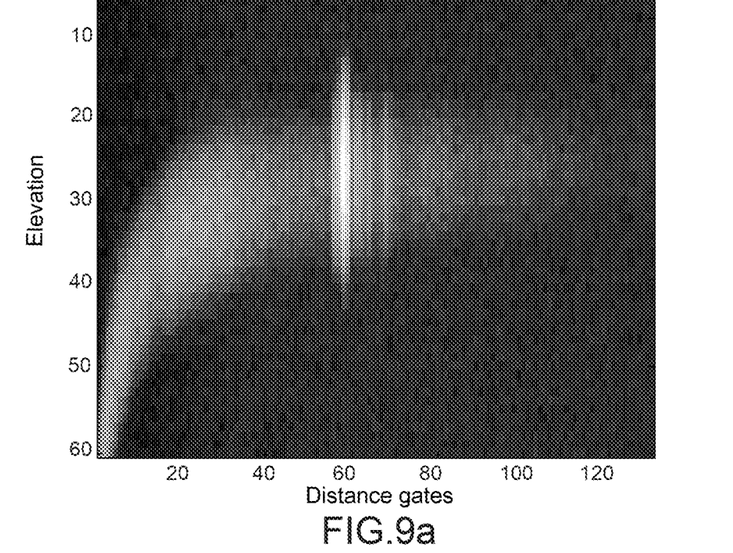
FIGS. 9a and 9b, recordings of radar echoes in the absence of rainfall and the linear regression residuals corresponding.
Figure 9B:
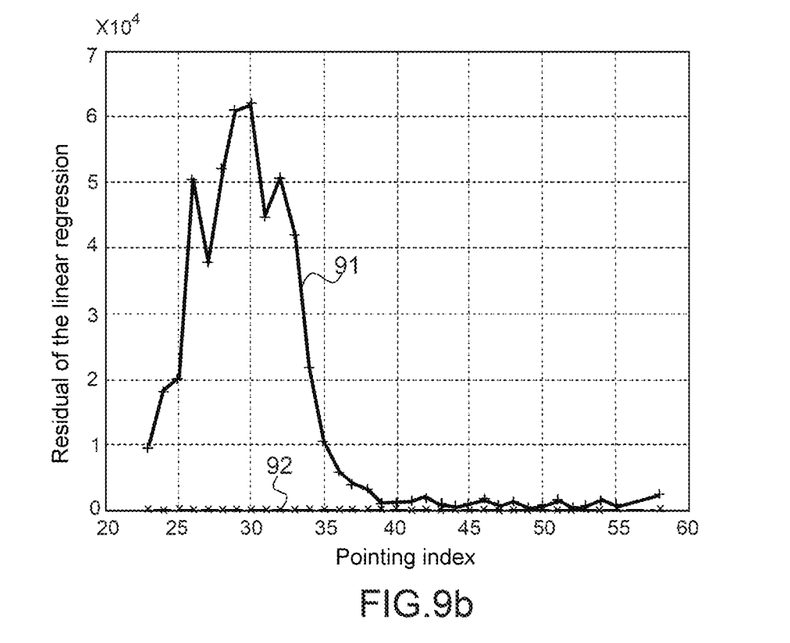

By way of comparison, FIGS. 9a and 9b respectively illustrate flight recordings in dry weather and the regression residuals corresponding in the elevational pointings, in a similar manner to the previous figures.

FIG. 9a illustrates the recordings in the various elevational pointings as a function of the distance gates. FIG. 9b shows by a first curve 91 the regression residual values and shows by a second curve 92 the values of the thresholds corresponding, as a function of the pointing indices.

FIG. 9b shows that the regression residuals are very broadly greater than the threshold in the pointings containing strong echoes, and also remain much greater than the threshold in the other pointings, the maximum confidence rate in this case being about $10^{-10}$. The rainfall hypothesis is therefore rejected in all the pointings.

The invention advantageously makes it possible to provide angle and distance information when echoes of targets alone are present, but also when echoes of targets and ground echoes are present, the two types of echoes being well distinguished and grouped together if appropriate by zones of pointings. Another noticeable advantage of the invention is its capacity to distinguish echoes generated by the ground from those generated by rainfall in more cases than with the solutions of the prior art. The invention also has the advantage of not requiring a particular calibration phase prior to its application.

The invention claimed is:

1. A radar detection method for distinguishing rain echoes from ground echoes, the method comprising:
   analyzing, for a number of distance gates in at least one given angular pointing, attenuation of radar echoes received by a mobile airborne carrier,
   receiving, as echo to a number of emitted pulses, a power in each distance gate, testing a model, which is log-linear with distance, on said powers, and classifying one or more of the radar echoes as a rain echo, (i) responsive to the respective attenuation statistically fluctuating, on a logarithmic scale as a function of distance, around an affine straight line within one or more thresholds and (ii) when said powers and the corresponding distances comply with said model, said powers fluctuating around said affine straight line within the one or more thresholds, wherein the analysis and the classification are performed aboard the mobile airborne carrier.

2. The method as claimed in claim 1, wherein coefficients of said log-linear model are estimated on the basis of the powers received in the distance gates.

3. The method as claimed in claim 2, wherein an arithmetic mean of the powers received in each distance gate as echo to said emitted pulses is used for the estimation of said coefficients.

4. The method as claimed in claim 1, wherein the powers received are summed with weightings originating from an estimation of the parameters of said log-linear model, a radar echo being classified as rain echo if the result of the sum is less than a given threshold.

5. The method as claimed in claim 1, wherein coefficients of said log-linear model are estimated according to a least squares criterion.

6. The method as claimed in claim 1, wherein coefficients of said log-linear model are estimated according to a maximum likelihood criterion, said affine straight line being obtained by linear regression, the linear regression residual being calculated for the powers received as echoes to the pulses emitted, the corresponding radar echo being classified as rain echo when the linear regression residual is less than a given threshold.

7. The method as claimed in claim 6, wherein said analysis being carried out on a number of distance gates in a given number of pointings, the linear regression residual is calculated for each pointing.

8. The method as claimed in claim 1, wherein the noise of said log-linear model is modeled as being distributed according to a probability law from a log-Gamma family.

9. The method as claimed in claim 1, wherein noise of said log-linear model is regarded as Gaussian noise.

10. A radar, comprising processing means implementing the method as claimed in claim 1.

\* \* \* \* \*